Jan. 29, 1952

W. M. SPRENG ET AL

2,583,753

ORCHARD SPRAYER

Filed Jan. 9, 1946

INVENTORS
WARREN M. SPRENG,
WILLIAM H. ZEHNER.
BY
Toulmin & Toulmin
ATTORNEYS

Jan. 29, 1952 W. M. SPRENG ET AL 2,583,753
ORCHARD SPRAYER
Filed Jan. 9, 1946 7 Sheets-Sheet 5

INVENTORS
WARREN M. SPRENG,
WILLIAM H. ZEHNER,
BY
Toulmin & Toulmin
ATTORNEYS Jan. 29, 1952 W. M. SPRENG ET AL 2,583,753
ORCHARD SPRAYER
Filed Jan. 9, 1946 7 Sheets-Sheet 6

INVENTORS
WARREN M. SPRENG,
WILLIAM H. ZEHNER.
Toulmin & Toulmin
ATTORNEYS

Patented Jan. 29, 1952

2,583,753

UNITED STATES PATENT OFFICE 2,583,753

ORCHARD SPRAYER

Warren M. Spreng and William H. Zehner, Ashland, Ohio, assignors to The F. E. Myers & Bro. Co., Ashland, Ohio, a corporation of Ohio Application January 9, 1946, Serial No. 640,072

3 Claims. (Cl. 299—37)

The present invention relates to a spraying and dusting machine for applying insecticides and fungicides to groves of trees, fruit and non-fruit bearing, to bushes and bush fruits, to ground crops, or weed killing chemicals to ground vegetation.

It has been the practice when applying a spray material to trees and bushes to employ so-called spray guns which were carried by an operator and connected to a supply of spray fluid under pressure. The operator would manipulate the gun moving it up and down toward the foliage and trunk and by shifting his position with respect to the tree, he thus attempted to cover all parts of the tree with the fluid. It is apparent that the completeness with which the spraying job was done under the circumstances would depend on the judgment of the individual gun operator and the time that he was willing to spend on each tree. Certain parts of the tree were bound to receive greater quantities of the spray fluid than other parts so that wastage of fluid and in some cases wastage of time of the operator could hardly be avoided in addition to the fact that perhaps considerable parts of the foliage or of the tree trunk would have escaped contact with the stream. The spray issuing from a jet gun of this type is in a more or less concentrated stream form, even when the tree is positioned a considerable distance away from the gun, so that the stream tends to strike only those surfaces of the foliage which are presented directly to the gun in which case the underside of the foliage might still not receive its share of the spray fluid.

Moreover, concentrated high pressure streams from guns in the hands of careless operators may seriously damage or knock off foliage and fruit.

The primary object of this invention is to provide an improved spraying machine which might also be used for dusting and in which the spray material is directed toward each tree of the tree row, each tree being treated in a uniform manner, assuring that all parts of the foliage, the upper and undersides thereof as well as all parts of the trunk and branches from the bottom to the very top of the tree, shall receive a uniform coating of the insecticide fluid.

Another object is to provide an improved spraying machine in which the spray is caused to envelop the tree as a soft fog in which the center of the fog area moves over all parts of the tree including the trunk and branches in a precise pattern form so that no parts of the tree and its foliage shall be missed by the spray stream. Still another object is to provide an improved spraying machine which shall be as nearly as possible automatic in its operation, particularly in regard to the manner in which the spray is directed in the horizontal and vertical paths, so that, when the adjustments of the machine have been once set and the machine is moved past each tree in succession, complete coverage of all of the foliage as well as the trunks and branches will have been obtained. Another object is to provide a machine of the type described in which none of the spray material is propagated out of the machine into the space between the trees and, therefore, is wasted.

A still further object is to provide a machine of this character in which the manufacturing costs will be lower than that of a high pressure machine to cover equal acreage, and operating costs for labor, fuel and upkeep will be lower because of greater speed of coverage, shorter operating time, and greater simplicity of construction. Whereas in the present machines on the market, a driver of the spray truck and at least two spray gun operators may be required to get the same coverage besides requiring more time due to slower rate of travel, our improved machine can be operated by a single operator who can accurately control not only the amount of spray fluid to be accorded each tree, and the direction in which the fluid shall be propagated toward the tree, but in addition, he can drive the machine between the rows of trees during the spraying operation.

The above objects are attained, in brief, by providing a machine which can be driven between the rows of trees and the spray material is blown onto and into the trees as the machine passes them. A large capacity, but relatively low velocity, blower is employed and spray material is introduced into the outlet of the blower which atomizes this material. The air from the blower causes the leaves and small branches to swirl, thus exposing all surfaces of the leaves, branches and fruit to an even deposit of the spray material which is carried by the stream of air. The blower is contained in a casing which is caused to swing through a predetermined arc in the vertical direction in order to be directed from the lowermost portion of the tree trunk to the uppermost leaf or branch, and when this motion is combined with the horizontal motion obtained when the machine is being driven past the tree, a tree surface of large area is uniformly exposed to the drenching and penetrating fluid.

Other objects and features will be apparent after the specification is perused in connection with the accompanying drawings in which:

Figure 5 is a sectional view taken through the gear box on the line 5—5 in Figure 2;

Figures 6 and 7 represent a modified structure in which the vanes are snapped to their forwardly directing position by remote control, such as a push button located near the seat of the driver who is operating the tractor or other pulling mechanism;

Fig. 17 is a diagrammatic showing of a modified structure for introducing the insecticide in powder form, while Fig. 18 is a still further modification showing another position in which the powdered insecticide may be introduced into the blower.

GENERAL CONSTRUCTION

The machine consists of a tank 1 for holding the spray mixture or solution, a low pressure pump 2 to supply spray material to nozzles in the manifolds 3, 4, 5, a blower 6 to develop an air blast which atomizes and carries the spray material onto trees and crops, and a single engine 7 to supply power to both the pump and the blower. The spray material is constituted of a liquid chemical which issues from the nozzles but combines with the air delivered by the blower at the nozzle box. The result is a foggy mixture which is sufficiently heavy as to respond to a directing force. All of these parts are mounted on a frame 8 to be pulled as a trailer behind a tractor or other vehicle or mounted on the chassis of a truck or a farm wagon. The pump 2 may be of the centrifugal type and takes spray material from the tank 1 and delivers it at relatively low pressure to the manifolds 3, 4, 5 located in the outlet of the blower. Nozzles 9 are provided in these manifolds to separate the fluid into individual and fine streams which facilitates atomigation when the material is being blown in the direction of the tree.

The blower 6 may also be of the centrifugal type and is mounted on bearings in a frame so that it can be oscillated mechanically. The axis of the blower is paralled to the lengthwise axis of the machine and the blower oscillates around its axis to sweep the nozzle outlet of the blower through an arc of approximately 90 degrees in the vertical direction, although the sweep of this arc can be readily adjusted as will be explained hereinafter to accommodate any tree height.

The blower casing is oscillated vertically by a mechanism driven by the blower shaft so that during the time the spraying machine is passing a tree the blower casing and, therefore, its outlet nozzle swing between the top and bottom of the tree a plurality of times. Simultaneously, means are actuated which cause the spray to be continuously directed toward the vertical center line of the tree.

The change in direction of the spray material in the horizontal plane is effected preferably by the use of vanes which are caused to swing automatically to follow the line of sight toward the tree throughout the distance over which the machine moves during the drenching of the trees with the spray material. This ideal distance will obviously be the distance between trees so that the machine is constantly drenching one of the trees from the time that it approaches that tree, beginning with a position halfway between that tree and the preceding tree and ending when the machine reaches a position halfway onto the succeeding tree. Thus, no travel effort on the part of the machine will be wasted, and during all parts of its travel, a spray will be projected against one or the other of the trees. In the event that the distance between trees is so far that this condition cannot be obtained, there is a provision on the machine for cutting off the spray fluid during that period of time when a tree is out of spray directing range.

Thus, the operation of the machine is such that the air stream carrying highly diffused spray material is propagated in a combined horizontal and vertical movement to envelop one-half of the tree, including the trunk as the machine proceeds between the tree rows, and the other half of the tree will be treated when the machine proceeds down the adjacent row.

DETAILED DESCIPTION

Structural framework and pumping mechanism

Figure 3:
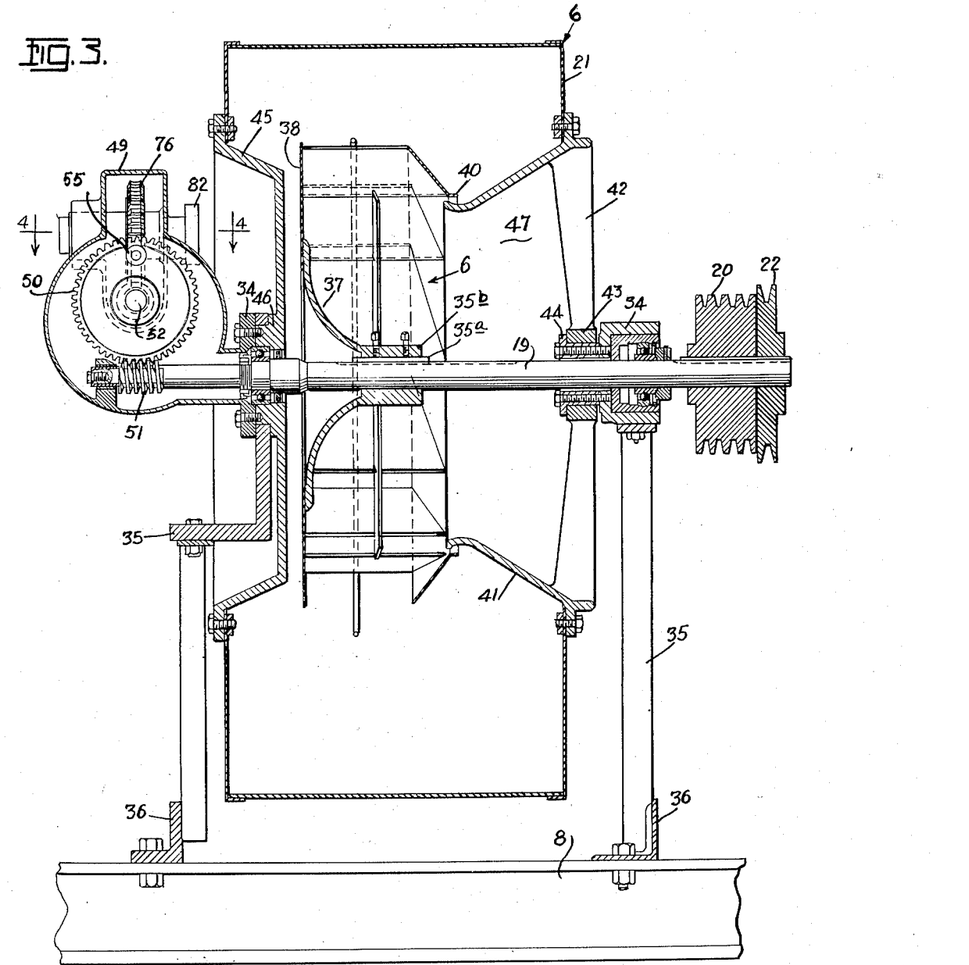
Figure 3 is an enlarged sectional view taken through the blower and the oscillatory mechanism on the line 3—3 in Figure 2.

The frame 8 may constitute a chassis formed of iron structural members, having at its front end a drawbar 10 and mounted at the rear end on wheels 11, with a bar 12 extending downwardly at the front end so that the machine will stay in a horizontal position when the tractor or other source of motive power has been removed. To the rear of the frame 8 and preferably directly above the wheels, there is a large tank 1 containing spray material, the tank being filled through a covered opening indicated at 13. Tension straps 14 may hold the tank to the frame. An engine indicated at 7 is also supported from the frame preferably at the front end, this engine being provided with a fuel tank 15, radiator 16 and the usual accessories. The main power shaft of the engine is indicated at 17 and a plurality of pulleys 18 are mounted on the shaft for transmitting power to an auxiliary shaft 19 through pulleys 20. The impeller of a fan 6 is mounted on the shaft 19 and contained within a casing 21 (Fig. 3). There is also a pullley 22 mounted on the shaft 19 and a belt 23 extending therefrom over a pulley 24 which is mounted on the pump shaft 25.

Figures 1, 15:
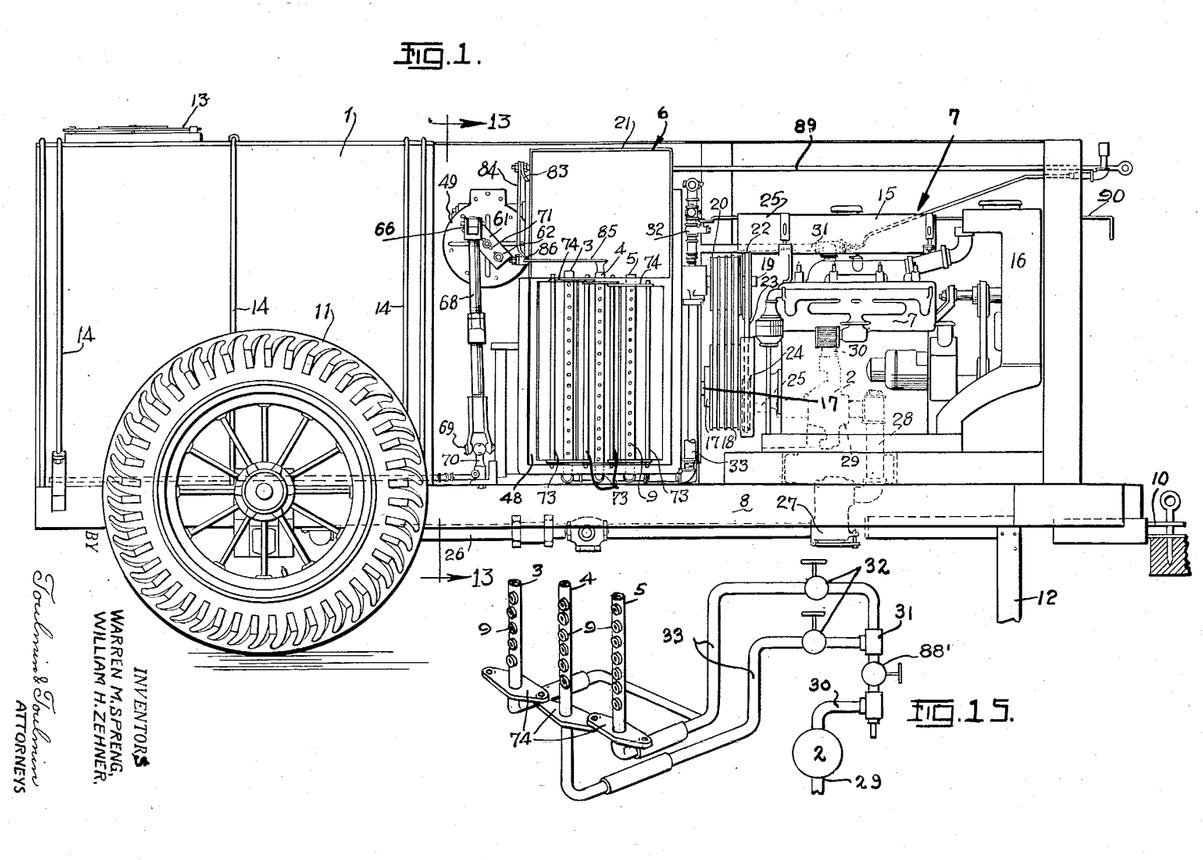
Figure 1 represents an elevational view of the improved machine.
Figure 15 is a diagrammatic perspective view of the insecticide pump, manifolds and circuit.
Figure 2:
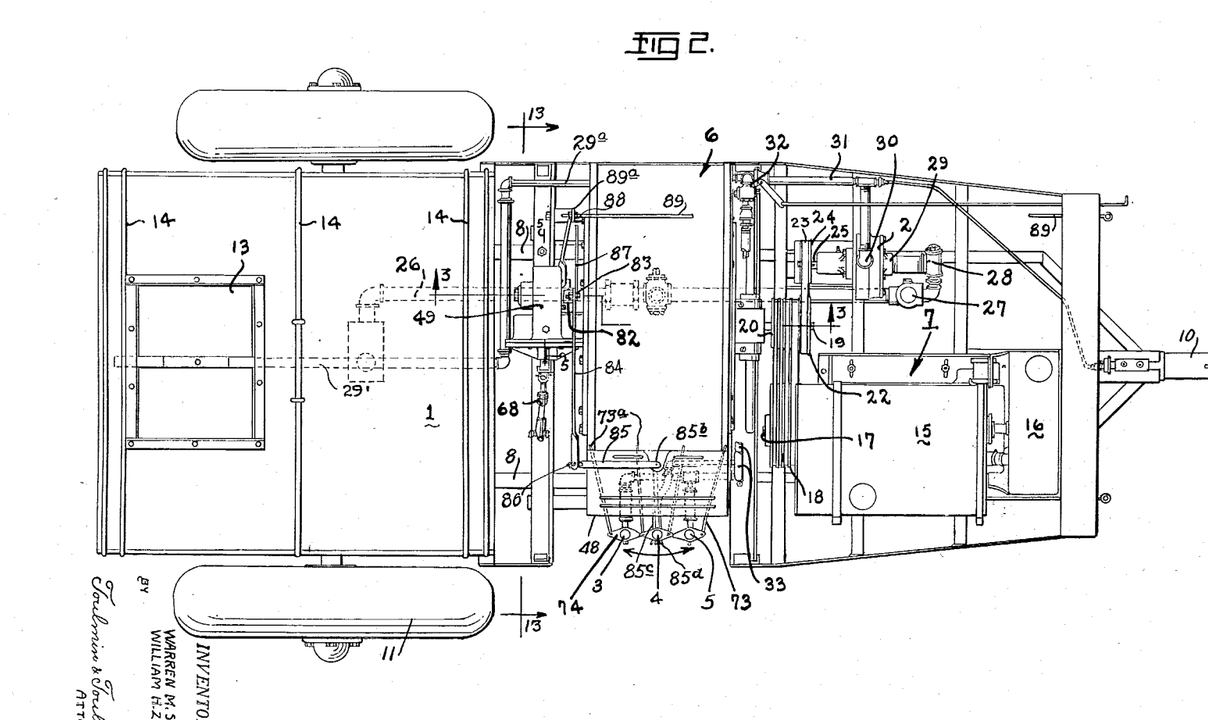
Figure 2 is a plan view.
Figure 8:
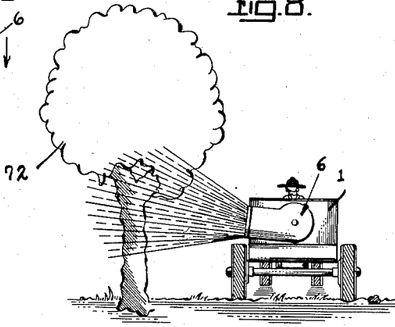
Figures 8 and 9 show diagrammatically the manner in which the improved sprayer can be caused to direct the insecticide fluid throughout the entire height of the tree.
Figure 9:
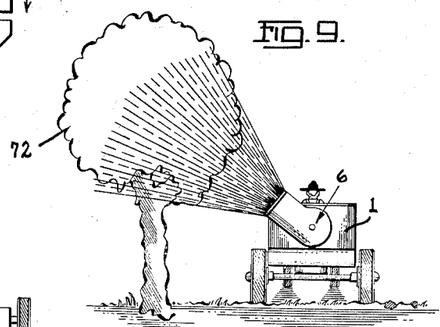
Figure 10:
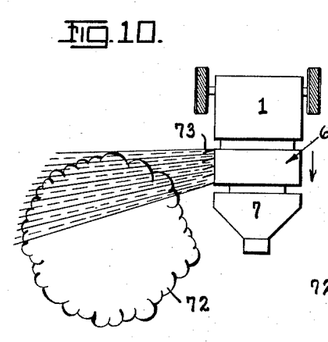
Figures 10, 11 and 12 are plan views of the machine and the tree under treatment showing diagrammatically the manner in which the tree is brought widthwise within the drenching effect of the sprayer.
Figure 11:
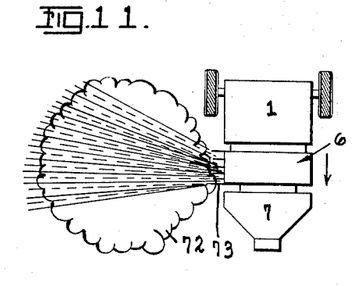
Figure 12:
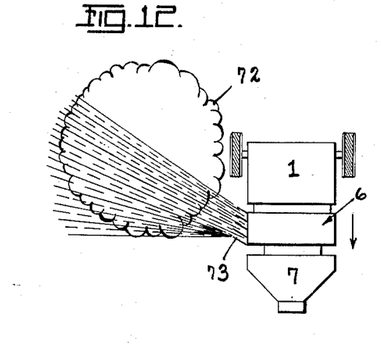
Figure 13:
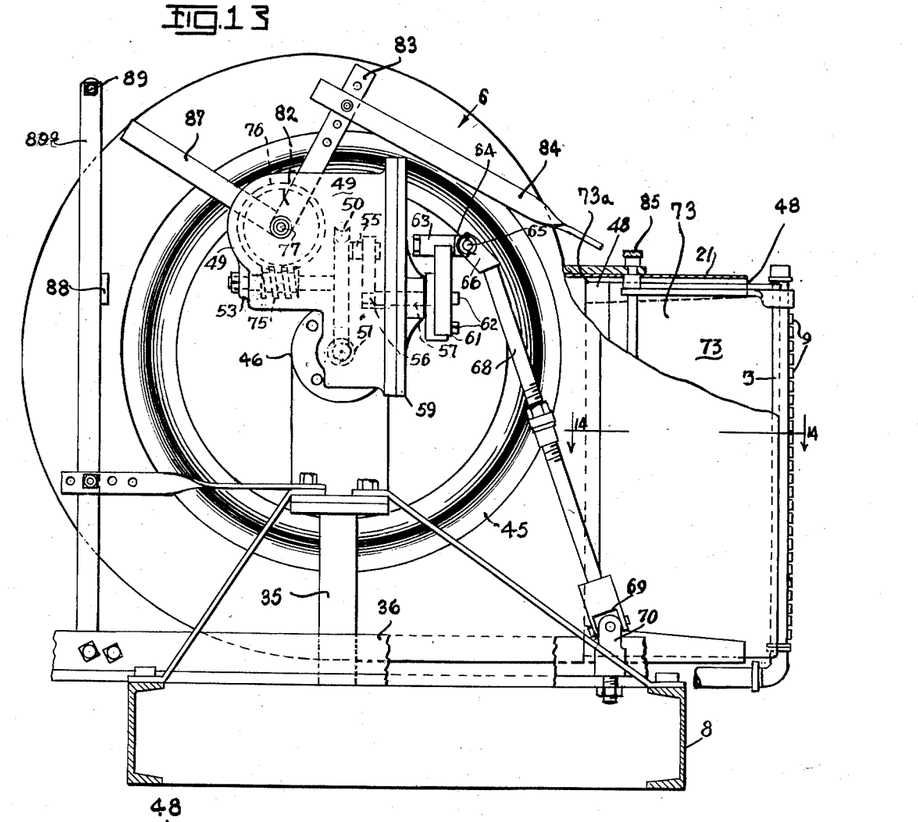
Figure 13 is a section on the line 13—13 of Figure 1.

The spray material from the tank 1 is conducted through a collecting pipe 26, a strainer 27 and pipe 28 to the input side 29 of the pump 2. Any conventional means for agitating the solution within the tank may be employed to insure a thorough mixture in the distributing pipe. As typical of such a means, we have illustrated in Figure 2 an agitator pipe 29' connected by the conduit means 29a with the discharge side of the pump and having holes along its length through which the liquid issues as jets. If desired, mechanical means of agitation may be employed, consisting of a rotating shaft (not shown) fitted with paddles, mounted lengthwise near the bottom of the tank and driven through proper speed reduction from the blower shaft. The outlet of the pump is carried through a pipe 30, a horizontal pipe 31, and through valves 32 to pipes 33 of which only the lower portion has been shown in Figure 1. The pipes 33 connect with the lower ends of the manifolds 3, 4 and 5. There are a number of nozzles 9 equidistantly distributed along the pipe manifolds 3, 4 and 5 so that when the pump is operated through the pulley and belt system described hereinbefore, fluid is withdrawn from the tank 1 through the pipe 26 by the pump and is passed through the various piping to the nozzles 9. As shown in Figure 15, when the upper valve 32 is closed, the mixture is admitted only to the nozzle manifold 4. The upper valve 32 controls the application of the mixture to the manifolds 3 and 5. Selection of these valves is determined by the size of the trees to be sprayed or the rate of travel or the quantity of liquid to be applied per tree.

It will be understood that all of this mechanism is carried on and suitably secured to the frame 8 so that the apparatus as a whole constitutes a unitary structure.

*Blower mechanism*

As shown more particularly in Figure 3, the blower 6 is preferably of the centrifugal type and is mounted on the shaft 19. The shaft is journalled at each end in bearings 34, preferably of the ball bearing type, and carried on a pair of rigid supports 35 which are secured by angle irons 36 to the frame 8. The fan hub 35*b* is keyed to the shaft as indicated at 35*a*, and is provided with a flared conical portion 37 which terminates in a flat disc 38. The vanes extend outwardly from the hub 35*b* in the usual manner and are secured to the disc 38, these blades being secured together at the inlet side to a ring 40 which loosely surrounds an inwardly projecting conically shaped inlet guide member 41. This latter member is provided with ribs 42 which converge to a hub 43. This hub is adapted to rotate on a sleeve-bearing 44 which surrounds the shaft 19.

The casing 21 may take the general form of a volute which is secured at one side to the outer edge of the member 41, and at the other side to a conical side-plate 45 provided at the center with a hub 46 and which surrounds the left hand ball bearing 34, and is adapted to rotate independently of the shaft 19.

The casing 21 is completely closed except for the inlet opening 47 of substantially circular configuration, and an outlet opening or nozzle box 48 of a substantially rectangular shape positioned directly in the rear of the manifolds 3, 4, 5 as seen in Figure 1.

As stated hereinbefore, the casing 21 is adapted automatically to oscillate or swing in the vertical direction and this oscillatory movement is obtained in the manner described presently. Directly to the left of the casing as seen in Figure 1, there is a gear box 49 containing a gear 50 which meshes with a worm 51 carried on an extension of the shaft 19. The gear 50 is mounted on a shaft 52 journalled in bearings 53, 54 (Figure 5). A crank pin 55 is secured to the outer face of the gear 50, this pin being loosely received by an arm or yoke 56 which, with the shaft 57, forms a crank. The arm 56 is slotted, as indicated at 56*a*, to permit the pin 55 to slide therein. The shaft 57 is journalled in a hub 58 which constitutes part of the front face 59 of the gear box 49.

It will be noted that the shafts 52 and 57 are out of rectilinear alignment when viewed from the position shown in Figure 5 but are in the same vertical plane when viewed in the direction shown in Figure 1. The purpose of this arrangement will be explained presently. An arm 59*a* is secured to the shaft 57 and is, therefore, rotatable with the shaft. A second arm 61 is adjustably secured to the arm 59*a*, as indicated at 62, and carries at its end a housing 63. A stud 64 is mounted on the end of the housing and a pin 65 passes slidably through the stud. A Y-clevis or yoke 66 is rotatably mounted on the pin 65 and held in position by oppositely disposed cotter pins 67. The clevis 66 threadedly engages a heavy rod or tubing 68 which terminates near the frame of the machine in a universal joint 69 and is secured to the frame by means of a stationary upright 70.

As the blower 6 is rotated through its pulley 20, the shaft 19 rotates the worm 51 and causes the gear 50 to rotate as seen in Figures 3 and 5. The crank pin 55 will cause the arm 56 to turn the shaft 57 so that the crank 61 which is positioned outside of the gear case 49 will be caused to rotate. As this crank turns the rod 68 will be caused to move through a vertical arc about the universal joint 69 to follow the crank 61, and in order to actuate the various instantaneous positions of the crank, the arm 56 will cause the crank 61, also the gear case 49, in fact the entire blower housing to oscillate in a vertical arc at right angles to the first-mentioned vertical arc. In other words, as the crank 61 rotates, the casing 21 is caused to move on the axis of the impeller, and a complete rotation of the crank causes a complete oscillation of the said casing through any predetermined angle. The amount of this vertical sweep can be controlled by changing the effective length of the crank 61 and this is done conveniently by providing slots 71 in the crank through which the bolts 62 pass.

Thus, the blower housing 21 can be caused to sweep or oscillate in a vertical direction through any desired angle depending on the effective length of the crank 61 and is caused to move through mechanical connections, including the impeller shaft by the engine 7. In practice, it may be desirable to leave the blower tilted at its uppermost position for a longer period of time than at its lower position in order to accommodate the slightly increased time necessary for the spray material to leave the blower and to strike the uppermost portions of the trees. This dwell at the upper position of the blower is obtained by positioning the shaft 52, 57 (Figure 5) out of alignment as seen in the plane of that vehicle as will be well understood in the art.

*Horizontal direction of the insecticide fluid*

It has been explained that in addition to the upward directing movement of the spray obtained by tilting the blower chamber, it is also necessary to move the spray slowly in a predetermined manner in the horizontal direction so that both directions of movement when applied compositely would tend to cause the spray material to strike each and every point of a wide area requiring contact of the spray material. Moreover, as the spraying machine approaches the tree to be treated, it is necessary that the line of sight between the machine and the tree shall constantly change, depending on the speed with which the machine passes a tree, in order that at all times the spray material shall be directed at the tree even though the machine may not be directly opposite the tree. The necessity of providing a blower which moves in a vertical direction in order to reach both the lower and the uppermost branches of the tree has been illustratively shown in Figures 8 and 9, while the extreme desirability of controlling the line of propagation of the spray material in the horizontal direction has been depicted in Figures 10, 11 and 12. It will be noted in these figures that the tree 72 is always in line with the propagated spray material both before and after the machine has reached the tree. This effect tends to increase the time during which the tree is being enveloped by the propagated material so that a better and more thorough spraying job can be effected.

In order to provide for the horizontal deflection of the spray material, we employ a plurality of vanes 73 which are vertically disposed within the nozzle 48. These vanes are secured as at 73a at their opposite upper and lower ends to the discharge opening of the blower casing and extend through the nozzle in a somewhat converging relationship and have their outermost edges swivelly secured to a plurality of links 74. The four vanes thus provide for three openings in the center of each of which is one of the manifolds 3, 4, 5 each of which is attached at its opposite ends to the links 74. By having the vanes 73 converge, the speed of the discharged air is augmented in order to enhance its atomizing effect on the spray material as well as to give the total spray increased force. It will be apparent that if one of the manifolds is moved, the other of the manifolds and the vanes will move synchronously therewith in order to direct the spray at any predetermined angle. During this movement the vanes flex about their connections at 73a.

It will be noted that inasmuch as the manifolds 3, 4 and 5 are in effect supported near the outermost edges of the vane structure, these manifolds are positioned at a considerable distance in front of the blower outlet opening. This arrangement is important as it insures that the body of air moving from the blower will have been concentrated to the desired shape as determined by the openings contained between the vanes before the air comes into contact with the spray fluid which is being ejected at the nozzles 9. Moreover, inasmuch as the fluid leaves the nozzles 9 at a predetermined speed, sometimes less than that of the air being delivered by the blower, the air tends to atomize the liquid particles so that a fog-like effect is obtained. Direction is given also the moving fog. When the slow moving fog-like stream strikes the foliage, the speed of the spray particles is not sufficiently great to tear the leaves away from the branches nor will any damage be done to the fruit whether in green or ripened stage. However, there is enough swirling effect in the stream of air as it reaches the tree to turn over the leaves gently in order for them to receive their share of the projected spray.

It is desirable that the vanes 73 and the manifolds 3, 4 and 5 be given an oscillating movement comparable to the speed of the machine so that the line of sight will always intercept the tree throughout the entire spraying travel of the machine. For moving the vanes in the so-called reversed direction, i. e. keeping the stream projected onto the tree after the machine has passed a position directly in front of the tree, a crank arrangement is employed for initiating this vane movement, whereas for moving the vanes in the forward direction an abrupt action is employed.

Figure 4:
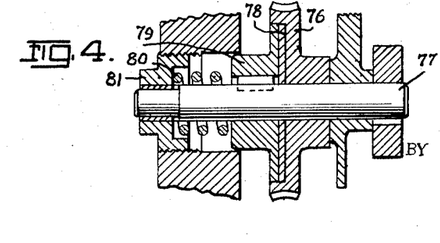
Figure 4 is a small sectional view taken along line 4—4 in Figure 3 to show the details of the slippage clutch.
Figures 5, 6, 7, 17, 18:
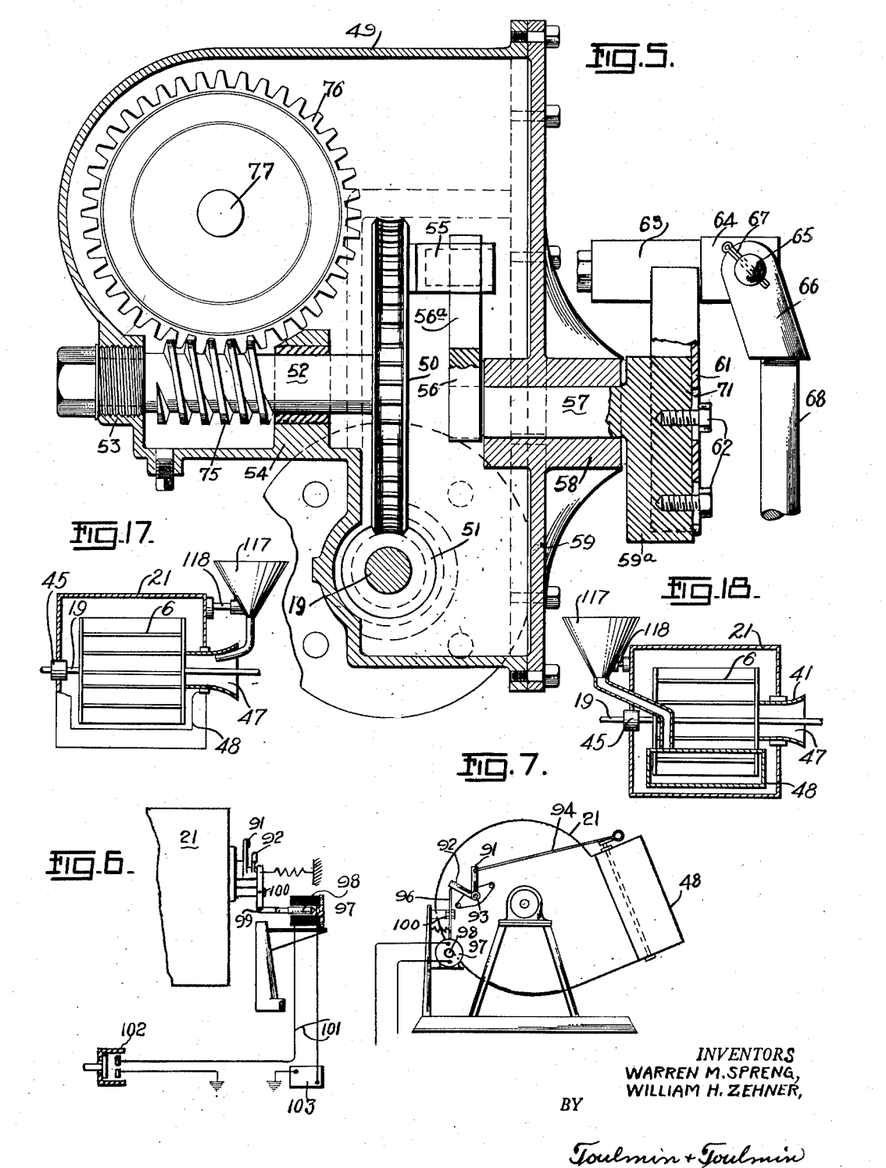
Figure 14:
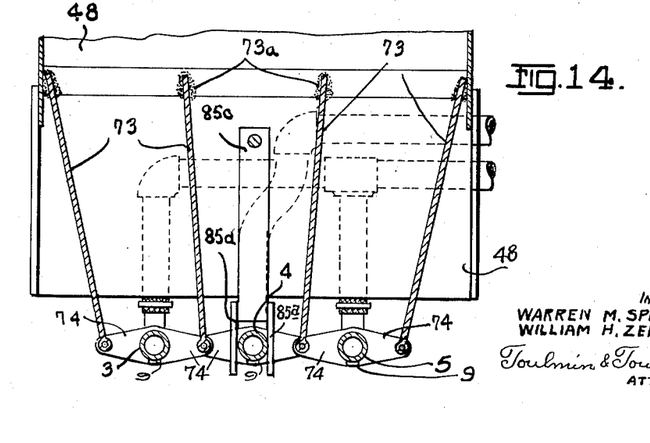
Figure 14 is a section on the line 14—14 of Figure 13.
Figure 16:
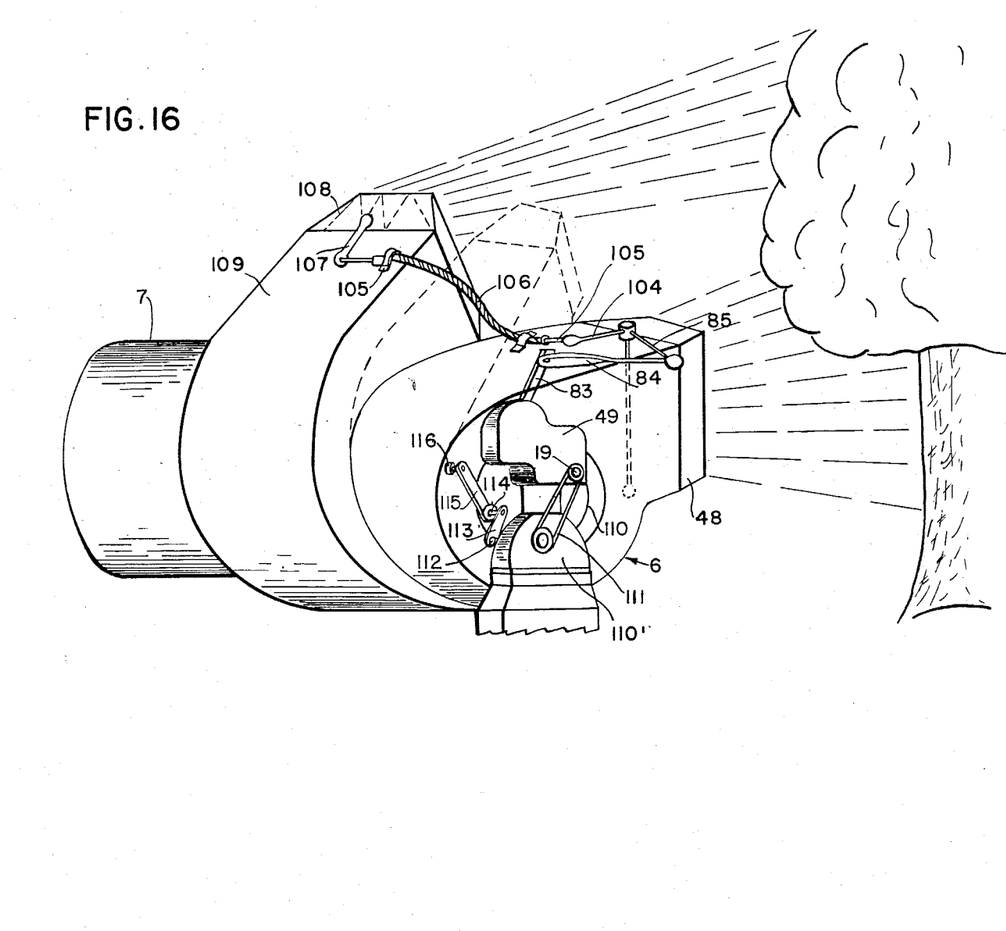
Figure 16 shows in perspective and partly diagrammatic, a modified structure embodying our invention and which provides for propagating greater amounts of spray fluid to the top of the tree than in the other modified structures.

As to the movement of the vanes in the so-called reverse direction, we employ a worm 75 secured to the shaft 52 (Figure 5) which meshes with a worm gear 76 loosely mounted on a shaft 77. This worm gear is provided with a clutch plate 78 (Fig. 4) against which bears a clutch 79 under the urge of a spring 80 which is contained in a housing 81 forming part of the gear case. A screw mechanism may pass through the housing 81 in line with the spring in order to change the tension of the latter as may be desired. The clutch 79 is keyed to the shaft 77 and the latter extends entirely through the upper portion of the gear casing as seen in Figure 3, and terminates in a crank 82. A lever 83 is attached to the crank arm 82 and a link 84 is bolted to the lever 83. The opposite end of the link 84 is fastened to the top arm 85 by a swivel 86. The arm 85 is pivoted to the fan casing at 85b and has fixed thereto an arm 85c which engages the manifold 4 as by the plates 85d as seen in Figure 14. This mechanism causes the vanes 73 positioned directly in front of the opening of the blower to be flexed for the purpose of directing the discharge of spray material.

A lever 87 is welded to the lever 83 and extends in a radial direction from the center of the shaft 77. This lever 87 oscillates with the blower. When it is desired to move the vanes 73 in the blower outlet to a forward position, the stop 88 is moved into contact with the lever 87 by shifting forward the trip rod 89 which is attached to the standard 89a which carries the stop 88. This shifting of the rod 89 bends the standard 89a about its connection with the angle iron 36 and positions the stop 88 in the path of the lever 87. This stops the oscillating motion of lever 83 and continued oscillatory movement of the blower and causes the clutch plate 79 to slip and to permit relative movement between the said lever and the blower casing in a direction opposite to that which obtained when the lever was driven by the reducing gears and clutch. The vanes 73 are then quickly moved to a forward position when approaching a tree. The stop 88 is then disengaged and the mechanism in gear box 49 slowly brings the vanes 73 back to the rear position. The speed of this movement may be varied, depending on the point at which lever 84 is connected to lever 83. The blast of spray material from the blower nozzle is thus caused to fall around the vertical center line of the tree approximately 180 degrees.

In order to actuate the manifolds and vanes as set forth above, the arm 85 is pivoted as at 85b and carries an arm 85c which has a bifurcated end or yoke as at 85d which embraces the manifold 4. Then, as the arm 85 is actuated by the link 84, the arm 85c is also actuated to swing the manifold 4 and, therefore, the manifolds 3 and 5 and the vanes 73 in the direction of the arrows in Figure 2.

Adjustment of the vanes 73 makes possible the changing of direction of the air-borne spray material to reach the trees from all angles with respect to the tree. As the machine approaches the tree, the operator adjusts the vanes 73 so that the air blast is directed toward the vertical axis of the tree. As the machine continues to move forward, the mechanism in gear box 49, on the axis of the blower, slowly adjusts the vanes 73 in the reverse direction, thus spraying foliage substantially halfway around the tree. As the vanes 73 are adjusted, the manifolds 3, 4 and 5 change in position also since these manifolds are connected with the vanes by the links 74. The fluid from the nozzles 9 is thus discharged into the middle zones of the air streams at all times. After passing the tree, the operator again adjusts the vanes 73 to direct the spray onto the next tree. Since this adjustment is in the nature of a sudden snap-back of the vanes 73, there is very little spray material wasted on the open interval between the trees.

In case the trees are irregularly spaced apart or are regularly separated, but the space between trees is longer than normal, it may be desirable to shut off the spray material for a short period of time while the machine is passing between the widely separated trees. For this purpose a valve 88' is employed and located in the main discharge line to shut off all flow. A rod 90 may be used to close the valve 88' is desired. It is obvious that this valve will also be closed while the machine is being drawn to a working location assuming that the engine and pump are operating. Furthermore the valves 32 may be selectively actuated to bring any desired number of the spray material supply means into operative condition for controlling the quantity of spray.

Thus, every contingency of operation is taken care of in this machine so that there will be no wastage of spray material even in the case of irregularly spaced trees. When the trees are evenly spaced, the spraying operation on one tree will have been entirely completed by the automatic continuous movement of the vanes and an instant later the vanes snap back to their original position to spray the next tree in line. Under these conditions, the time of the operator as well as wear and tear of the machine are reduced to a minimum and the most complete spraying job on each individual tree is effected. After the machine passes between two rows of trees and applies spray to the front side of trees in that row, it is then preferably drawn around an end tree to proceed down the next row in order to spray the opposite sides of the trees which had been previously sprayed although it will be understood that the drenching effect of the spray material on the first half of a given tree is so thorough that a considerable part of the opposite side of the trees is also covered during the first travel of the machine past the tree. It has been found that the correct changeover in direction of the vanes in moving from their maximum reverse position to the maximum forward position minimizes the amount of spray that is misdirected during this changeover process, thus again conserving the spray material.

It has been explained that this change of direction of the vanes from reverse to forward is accomplished by having the operator pull on rod 89, which serves to introduce a stop 88 into the path of the lever 87. This stop effectively moves endwise as can be seen in Figure 2, and it is apparent that instead of having the operator pull the rod 89 from a position at the spray machine unit, the rod may be operated by remote control from the seat position of the tractor or other pulling vehicle so that a single operator can both pull the spray machine as well as operate the same.

In Figures 6 and 7, we have shown modified apparatus by which the correct adjusting of the vanes from the reverse to the forward position can be obtained by remote control, utilizing an electromagnet and a push button energizing circuit. An L-shaped lever having legs 91, 92 respectively is pivoted at 93 to the blower casing so that this pivot is given an oscillatory movement in accordance with the vertical sweeps of the blower. A link 94 is attached to the lever 91 and at its opposite end the lever 94 is attached to a crank which is adapted to rotate the center manifold 4 and in this manner swing all of the vanes.

Now assuming that the blower casing 21 is moving to and fro, it is apparent that the L-shaped lever 91, 92 would simply rock about the casing and no motion would be transferred to the vanes. However, provision is made for introducing a removable stop 96 against the lever arm 92 as the blower casing is oscillated so that when the stop is in place against the lever arm further movement of the casing will in effect cause the L-shaped lever to swing about its pivot 93 to rotate the vanes from one direction to another direction. The removability of the stop rod 96 is controlled through a solenoid 97 which can receive an armature 98 swivelled or hinged to one end of the rod 96 as indicated at 99. The rod 96 is preferably pivoted at 100. Electrical conductors 101 are taken through a push button contact device 102 and a battery 103. The device 102 would be located at the driver's seat and by simply pressing the button, the stop rod 96 is caused to move in the path of the L-shaped lever and thus, quickly change the position of the vanes from the reverse direction to the forward direction as the machine starts to approach the next tree.

This machine is described for applying liquid spray material. It can be readily constructed for applying material in dust form by substituting for the pump suitable means for moving dust instead of liquid; substituting for the tank 1 a suitable container for the dust; introducing the dust by suitable means at the inlet of the blower 6; and eliminating the manifolds 3, 4 and 5.

This modification has been diagrammatically illustrated in Fig. 17 in which a hopper 117 containing the insecticide dust is fed to the suction inlet 47 of the blower 6. The hopper may be affixed to the blower casing 21 as indicated at 118. A cloud of dust is emitted at the outlet 48. It will be understood that the directing vanes 73 and manifolds 3, 4 and 5 have been removed from this outlet but the blower casing 21 is still caused to oscillate in the vertical direction by the mechanism heretofore described. Separate hoppers may be provided for all of the blowers in case more than one blower is employed as in Fig. 16.

Instead of introducing the dust in the inlet of the blower, the same could obviously be injected into the output of the blower at a position where the vanes would normally be located in the event that a liquid spray material was being used instead of dust. This particular modification has been shown in Fig. 18 in which corresponding parts bear the same reference characters as in Fig. 17. The insecticide dust in the hopper 117 is introduced into the outlet compartment 48 of the blower or blowers and the vanes 73 and manifolds 3, 4 and 5 have again been eliminated. The blower casing or casings are adapted to be oscillated in the vertical direction as was explained hereinbefore. Under certain circumstances it may be desirable to introduce at the output of the blower not only dust, but also a liquid and depend on the liquid spray to carry the dust a greater distance than if only the stream of air were used for this purpose. It is obvious that the direction in which the dust will be propagated from the machine will be represented by the composite direction of the vertically oscillating blower casing and the horizontal movement of the machine past the tree or bush being treated by the dust.

It will be apparent that by providing a power plant of suitable size, the spraying machine could have its wheels 11 geared thereto to be propelled thereby instead of being drawn by a tractor as has been set forth. In this event, the speed of travel of the spraying machine across the ground would be positively linked with the speed of oscillation of the blower and the flexing of the vanes. In this manner it would be possible to maintain a spray directed toward a tree with the minimum of attention.

In Figure 16 we have shown a modified form of blower in which one part of the blower remains stationary and is tilted at such an angle to propagate spray fluid or dust to reach the upper portions of the tree. The other part of the blower is caused to oscillate as has been explained hereinbefore so as to start the spraying effect at the base of the tree and then to ascend the tree as the machine proceeds over the ground, so that finally the oscillating portion of the blower will add its effect to the stationary blower portion in drenching the upper parts of the tree. Finally the oscillatory blower portion will start to descend the tree to reach its initial lowermost position. Similar reference characters have been given to the structure shown in Figure 16 as in the other figures to designate corresponding parts. However, the engine or motor 7 has been diagrammatically illustrated. From out of the gear casing 49 the lever 83 is taken to connect through the links 84 and 85 to move the links 74 (Figure 14) positioned within the nozzle opening of the blower. A crank lever 104 is secured to the lever 85 and a reciprocable shaft 105 is attached to the end of the lever 104. This shaft passes through a protecting stationary cable 106 to connect with a lever 107 for swinging the vanes 108 contained in the nozzle of the stationary blower 109. The inlet opening of the blowers 109 and 6 is indicated at 110. An impeller is contained within the blower casing 109 as in the case of blower casing 6, both of the impellers being driven through a shaft 19 (Figure 3) from the engine 7.

A somewhat different type of blower oscillating mechanism is shown in Figure 16 from that illustrated and described in connection with the other figures. In this particular case, the mechanism is contained within a gear case 49 for actuating the lever 83 as was explained in connection with the other figures. Directly below the gear case there is a speed reducing mechanism indicated at 110′, including gears which are actuated through pulleys over which a belt 111 travels. The output shaft of the mechanism 110′ is indicated at 112 and this shaft carries a crank 113. A stub shaft 114 is secured to the crank 113 and a lever 115 is rotatably mounted at one end of this stub shaft. The other or upper end of the lever is pivoted as indicated at 116 to the casing of the blower. Assuming that the shaft 19 is driven in any suitable manner from the engine 7, the shaft 112 is rotated at a reduced speed which in turn causes the lever 115 to swing in the vertical plane and to exert a pull or push at the point 116 on the blower casing, depending on the instantaneous position of the crank 113. This will cause the casing 6 to oscillate about the shaft center 19 in the vertical direction at a speed depending on the adjustments of the crank mechanism 113 and the speed reducing device. The crank 113 may be adjustable in length in the same manner as the corresponding blower oscillating crank in Figure 13.

In order to alleviate any possibility of friction between the moving casing 6 and the stationary casing 109, it is preferable that a predetermined spacing be provided between casings. It will be noted that the mechanism for swinging the vanes in the stationary blower casing 109 is effectively connected in parallel to the vane operating mechanism in the nozzle 43 of the oscillatory casing 6. Consequently, the vanes in the nozzle of both casings are pointed in the same horizontal direction at any given time and the composite stream of liquid spray or dust will always be directed toward the tree under treatment. By providing a stationary blower casing and also an oscillatory blower, both of which serve to propagate spray or powder, absolute assurance is obtained in reaching the uppermost portions of the tree which are often the more difficult to drench or cover, particularly in case the tree is rather tall. It will be understood that inasmuch as the stationary blower 109 is continuously trained on the upper portion of the tree, it may not be any longer necessary to require the oscillatory blower casing 6 to dwell at its upper limit of vertical travel because at this point both sections of the composite blower are being trained to drench the upper foilage of the tree.

It will be understood that we desire to comprehend within our invention such modifications as come within the scope of the claims and the invention.

Having thus fully described our invention, what we claim as new and desire to secure by Letters Patent is:

1. A spray machine comprising a blower casing having a discharge opening, a plurality of spray nozzles positioned in the region of said opening, means for supplying spray material under pressure through said nozzles, a plurality of movable vanes positioned in the region of said nozzles for directing the spray material in a horizontal direction, means mechanically coupled to the operating parts of said machine for automatically and continuously oscillating said blower casing in the vertical direction, means mechanically coupled to the operating parts of the machine for moving the vanes at a predetermined rate of speed throughout their travel in one direction during the time that the machine is spraying a given tree, and means for moving the vanes at an accelerated rate in the opposite direction in order to immediately direct the spray onto the next tree which the machine is approaching.

2. In an insecticide distributing machine comprising a blower having a casing with a discharge opening together with means for introducing insecticide material into said discharge opening for being picked up by the discharge of said blower, said casing being mounted for oscillatory movement in the vertical direction on the blower shaft the combination of a lever of fixed length adapted to swing about a fixed point at one end, the other end of the lever being connected with a slidable crank mechanism driven by a shaft, means for driving said last-mentioned shaft, said last mentioned means including a driving shaft which is positioned out of rectilinear alignment with the shaft that drives said crank mechanism, said crank mechanism being connected to the blower casing to cause the latter to oscillate in the vertical direction when the crank is rotated.

3. In an insecticide treating machine for trees, bushes, etc. comprising a blower having a casing with a discharge opening together with means for introducing insecticide material into said discharge opening for being picked up by the discharge of said blower, said casing being mounted for oscillatory movement in the vertical direction on the blower shaft the combination of a lever of fixed length adapted to swing about a fixed point at one end, the other end of the lever being connected with a slidable crank mechanism driven by a shaft, said last-mentioned means also including a driving shaft which is positioned out of rectilinear alignment with the shaft that drives said crank mechanism, said crank mechanism being connected to the blower casing to cause the latter to oscillate in the vertical direction when the crank is rotated the distance between the axis of said driving shaft and the shaft that drives said crank mechanism determining the time that the blower remains at one of its limits for a greater length of time than at the other limit.

WARREN M. SPRENG.
WILLIAM H. ZEHNER.

REFERENCES CITED

The following references are of record in the file of this patent:

UNITED STATES PATENTS

| Number | Name | Date |
|---|---|---|
| 708,622 | Coleman | Sept. 9, 1902 |
| 892,703 | Barber | July 7, 1908 |
| 1,503,159 | Haywood | July 29, 1924 |
| 1,558,282 | Prang | Oct. 20, 1925 |
| 1,723,955 | Shepherd | Aug. 6, 1929 |
| 1,829,298 | Rimedio | Oct. 27, 1931 |
| 1,859,567 | Knapp et al. | July 24, 1932 |
| 1,980,427 | Parker | Nov. 13, 1934 |
| 2,150,767 | Heim | Mar. 14, 1939 |
| 2,220,082 | Daugherty | Nov. 5, 1940 |
| 2,358,318 | Daugherty | Sept. 19, 1944 |
| 2,374,955 | Raper | May 1, 1945 |
| 2,475,449 | Daugherty | July 5, 1949 |